Sept. 13, 1966  B. JORGJI ETAL  3,272,228
CROSS-CONNECTION VALVE
Filed Feb. 13, 1964  2 Sheets-Sheet 1

Inventors:
Bernard Jorgji
Karl Hinsch
By: Spencer & Kaye
ATTORNEYS

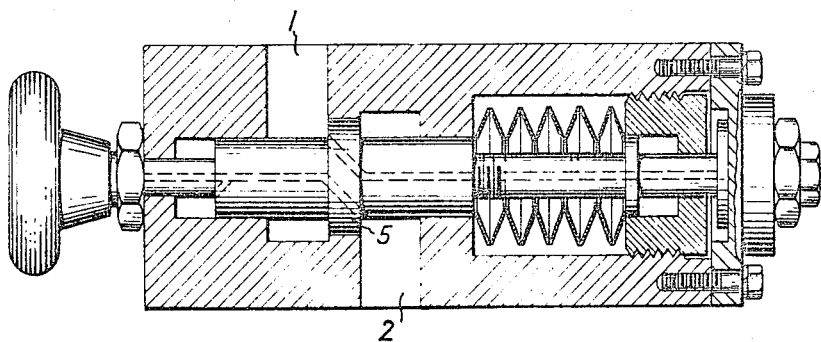
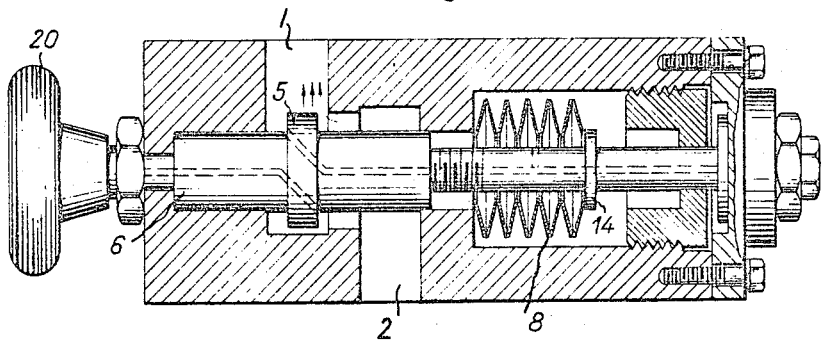
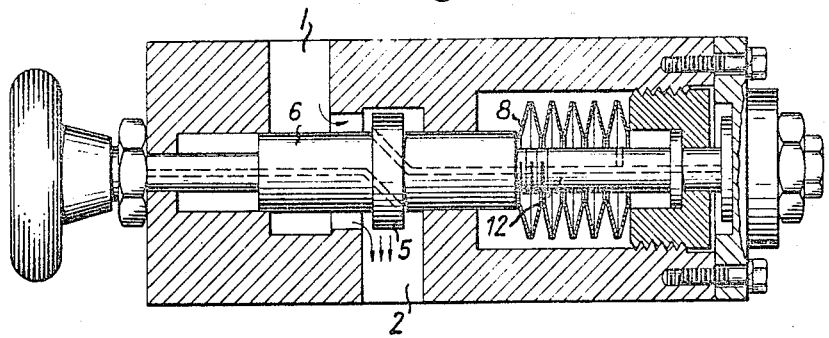

United States Patent Office 3,272,228
Patented Sept. 13, 1966

3,272,228
CROSS-CONNECTION VALVE
Bernard Jorgji, Hamburg-Lokstedt, and Karl Hinsch, Hamburg, Germany, assignors to Licentia Patent-Verwaltungs-G.m.b.H., Frankfurt am Main, Germany
Filed Feb. 13, 1964, Ser. No. 344,648
10 Claims. (Cl. 137—493)

The present invention relates generally to the valve art and, more particularly, to a safety cross-connection valve which connects pressure feed and return conduits in hydraulic devices having closed hydraulic flow path systems.

Such arrangements are used to avoid the creation of undesired pressure differentials in the system by means of limited pressure balancing. Previously, disk valves or ball valves were used for this purpose. However, such valves tend readily to flutter, particularly when pressure variations exist and as a result there is a high wear and tear on the valves because the valve seats deform.

In open hydraulic flow path systems, piston valves are already used which have a more favorable mode of operation. However, previously the use of two piston valves as a safety cross-connection, and which is necessary in a closed hydraulic flow path system, was deemed too expensive.

With these defects of the prior art in mind, it is a main object of the present invention to provide a piston valve arrangement which requires less expense than previously for piston valves in this type of installation.

Another object of the invention is to provide a device of the character described which operates more smoothly and economically than previously used valve arrangements such as disk valve and ball valve arrangements.

Another object of the invention is to provide a piston valve arrangement as a safety device for hydraulic machines having closed flow circuits.

These objects and others ancillary thereto are accomplished in accordance with preferred embodiments of the invention wherein a valve piston is provided which has a piston rod extending from both sides thereof. Both sides of the piston rod are supported and the piston and the piston rod are displaceable in both directions against the force of resilient means and particularly against the force of a pretensioned spring arrangement. The valve piston in its neutral position seals conduit connections for the pressure oil which open on both sides of the valve piston into the valve piston cylinder, and, for example, one conduit connection can be connected to the feed line of the hydraulic closed flow circuit and the other can be connected to the return or exhaust line thereof. When the valve piston moves to one of the two operating positions to the side of its neutral position it provides communication between the conduit connections disposed one on each side of the valve piston.

In one feature of the invention the pretensioned spring arrangement is provided within a spring cylinder casing or housing which itself is disposed in the valve housing. This spring is dually effective and is disposed in axial alignment with the valve piston rod. One end of the valve piston rod engages the front surface of the spring device and the other surface of the spring device engages a collar on the spring rod. This rod extends axially through the spring device and extends into the hollow piston rod and is connected with this rod by a threaded connection so that they may be axially displaced with respect to each other. The spring rod is rotatable from a point externally of the arrangement.

Another feature of the invention is that the pitch of the spring rod thread is equal to the pitch of a spring abutment which is threadedly movable within the spring cylinder housing and which engages one end of the spring device. This spring abutment is mounted on the spring rod so as to be axially displaceable with respect thereto but is non-rotatably connected thereto.

A further feature is the coupling of the valve piston rod with a shaft which extends externally of the valve housing and which is rotatably mounted within the valve housing, the connection being on the opposite side of the valve piston from the spring device. By means of this shaft, the piston valve may be opened by threading the valve piston rod on the spring rod which is mounted within the valve housing.

Another feature provided for decreasing the difference of the hydraulic pressures which are effective on both sides of the valve piston is that each conduit connection is provided with oil pressure chambers disposed respectively on opposite sides of the valve piston and connected by bores so that the oil of the chambers presses against the end surfaces of the valve piston. This is provided in such manner that the chambers effective on one side of the valve piston are connected with the conduit which provides pressure on the opposite side of the valve piston itself.

Additional objects and advantages of the present invention will become apparent upon consideration of the following description when taken in conjunction with the accompanying drawings in which:

FIGURE 2 is a schematic sectional view of the valve in its neutral position.

FIGURE 3 is a view similar to FIGURE 2 showing the valve in one of its operational positions.

FIGURE 4 is a schematic sectional view similar to FIGURE 2 showing the valve in another operational position.

Figure 1:
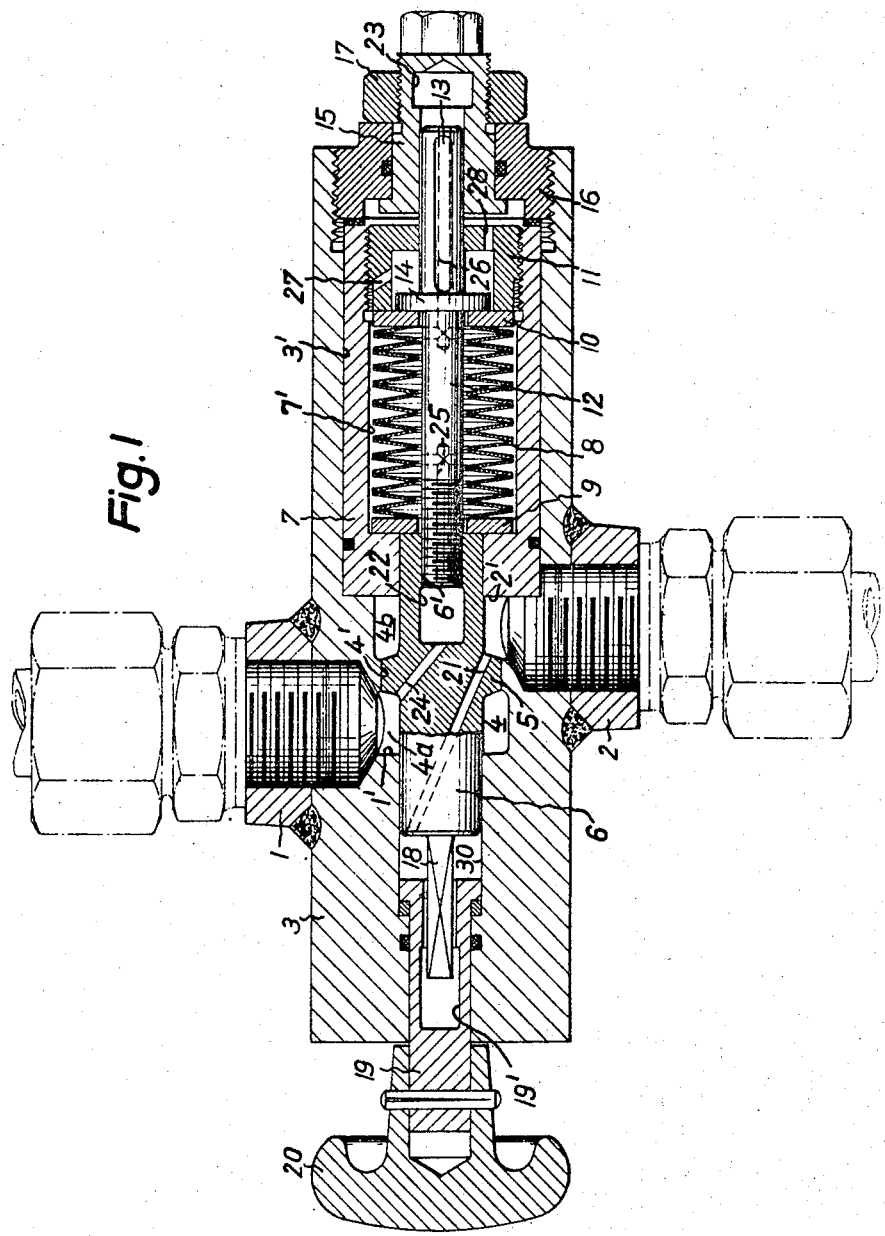
FIGURE 1 is a longitudinal sectional view through a piston valve arrangement in accordance with the present invention.

With more particular reference to the drawings, FIGURE 1 illustrates a preferred embodiment of a valve arrangement constructed in accordance with the present invention. A valve housing 3 is provided and conduit connections 1 and 2 are connected thereto so that they are capable of communicating with each other through the interior of the valve housing 3. These conduit connections 1 and 2 are disposed generally opposite one another and laterally displaced. A valve piston cylinder 4 is provided so that communication between the conduit connections 1 and 2 can take place via ports 1' and 2'.

A valve piston 5 is provided in the cylinder 4 and is normally disposed in valve seat 4' which divides the cylinder into two portions 4a, 4b. A valve piston rod 6 extends through the piston and projects on either side thereof. On the left side of the piston, the piston rod 6 is mounted in the left side of the valve housing while on the right side it is supported in a front wall or surface of a spring cylinder casing 7 which defines a spring cylinder 7'. This spring cylinder casing 7 is disposed in an opening 3' which is provided in the valve housing 3.

The spring cylinder is provided with a series of serially connected cup or plate springs 8 which are in the form of disks and which are connected between loose end plates 9 and 10. When the valve piston 5 is in its neutral position, the plate 9 abuts against the left or bottom surface of the spring cylinder and also abuts against the right end face of the valve piston rod 6. The other loose end plate 10 engages the spring stop or abutment 11 which is disposed in the spring cylinder casing 7 and is threadedly engaged therewith. The abutment is therefore axially displaceably but non-rotatably connected with the spring rod 12 by means of the spline 13. The end plate 10 is also abutting against the collar 14 which is fixed to the spring rod 12.

The left end of the spring rod is threaded and extends into a threaded bore 6' on the right portion of the valve piston rod 6 so that these two elements are threadedly connected together. This spring rod 12 is also supported on its right end to be axially displaceably and non-rotatably connected to a rotatable hollow bolt 15 having a hexagonal nut-like head at its right end. This bolt 15 is connected with the spring rod 12 by means of the spline 13. The bolt 15 is rotatably mounted in the valve housing closure 16 which is threaded into the end of valve housing 3. A nut 17 is used so as to fixedly connect the bolt 15 with the closure 16 and thus with the valve housing 3.

The left end of the valve piston rod 6 is fashioned as a square stud shaft 18 which is connected with a handle rod 19 which has a bore 19' in the right side thereof and which opens so that the stud shaft 18 can fit thereinto in an axially displaceable manner. The shape of the opening in rod 19 and of that of shaft 18 are such that they are not rotatable with respect to each other. For example, both may have square cross sections. The handle rod 19 is guided or journalled in the valve housing 3 and carries a hand wheel 20 at its end.

The space 30 behind the left side of the valve rod which is filled with oil is connected with the port 2' and thus the conduit connection 2 via a bore 21. There are other oil filled spaces on the right side of the valve rod and these include the hollow chamber 22 in the valve piston rod 6, the spring cylinder 7', and the hollow chamber 23 which is on the right side of or behind the spring rod 12 in the bolt 15. These are all connected with the port 1' and thus the conduit connection 1 by means of bores 24 through 28. Thus, the bore 24 connects the port 1' with the chamber 22. A bore 25 disposed interiorly of spring rod 12 connects chamber 22 with spring cylinder 7'. Another bore 26 in the other end of the spring rod 12 connects the spring cylinder 7' with the chamber 23. Also, the chambers disposed within spring stop 11, and to the right of the spring stop 11, are connected with the oil in the spring cylinder 7' by means of a bore 27 and a bore 28, respectively.

By means of these connections the front or end faces of the piston rods are exposed to the ambient pressures on the opposite sides of the valve piston 5. Thus, the pressure of the conduit connection 1 which acts on the left side of the valve piston 5 acts on the right side of the portions of the valve piston rod. In similar manner, the oil pressure in the conduit connection 2 which acts on the right side of valve piston 5 also acts on the left side of the valve piston rod. By suitably designating the end faces of the valve piston 5 and the valve piston rod 6, the effect may be achieved whereby the pressure or force differential which occurs upon excess pressure on one side for shifting the valve piston 5, is substantially smaller than the force differential produced by the oil pressure effective solely upon the annular surfaces on both sides of the valve piston 5. This, in turn, results in a substantial decrease in the dimensions of the spring device.

In order to adjust this spring arrangement, the nut 17 is loosened and the pin 15 can be moved by means of its hexagonal projection. By this means the spring rod 12 and its collar 14 are displaced as well as the spring abutment or stop 11 which is displaced to the same degree so that the plate 10 in the neutral position of the valve piston 5 is always supported on the spring abutment 11 as well as on the collar 14 when this valve piston remains in its neutral position.

FIGURE 2 illustrates the piston valve device when oil in the conduit connections 1 and 2 is at the same pressure and the hydraulic ambient forces on both sides of the valve piston 5 neutralize each other. The pretensioned spring device remains in its rest position and the valve piston 5 remains in its neutral position.

In FIGURE 3, it is assumed that the oil pressure in conduit connection 2 is greater than that in conduit connection 1 and the valve piston 5 moves to the left under the influence of the oil pressure and moves the valve piston rod 6 also to the left. This movement is against the spring pressure of the springs 8 which are compressed by the influence of the valve piston rod 6 through its collar 14. Thus, a connection has been provided between the conduit connections 1 and 2 and the desired pressure equalization in the closed hydraulic flow path system which is connected with the valve arrangement has also been provided.

When there is excess oil pressure in conduit connection 1 the valve piston 5 with its valve piston rod 6 moves toward the right due to the hydraulic differential force which arises as shown in FIGURE 4. This movement takes place against the increasing force of the spring device which is compressed directly by the valve piston rod 6 through the loose disk 9.

FIGURE 3 may also be considered to be a view of the piston valve device after the valve piston rod 6 and the valve piston 5 have been moved to the left by turning the hand wheel 20. When the hand wheel is turned, the valve piston rod 6 rotates and is displaced because it is threaded onto the spring rod 12 during this operation. The disk springs 8 are further compressed by the collar 14 on the spring rod 12 during this operation. In order to return the valve piston 5 into its neutral position, the hand wheel 20 is rotated in the opposite direction until no opposing spring force can be felt. There is no need for readjusting the pretensioning of the spring device after manually closing the piston valve 5.

It will be understood that the above description of the present invention is susceptible to various modifications, changes and adaptations, and the same are intended to be comprehended within the meaning and range of equivalents of the appended claims.

What is claimed is:

1. In a piston valve device providing a safety cross-connection between a feed conduit and a return conduit in hydraulic machines disposed in a system having a closed hydraulic flow path, the improvement comprising:
   spaced first and second conduit connections;
   means defining a valve piston cylinder which is in communication with said conduit connections;
   a valve seat disposed in said valve piston cylinder and via which said conduit connections may be in communication with each other;
   a valve piston having a neutral position in said seat and blocking communication between said conduit connections and movable toward two positions one on each side of said seat to permit communication between said conduit connections;
   means defining a spring cylinder having a stop surface at each end;
   a valve piston rod extending from both sides of said piston and supported on both sides thereof;
   two spaced-apart stop members disposed in said spring cylinder for movement with said piston;
   resilient means including a single spring element disposed in said spring cylinder between said stop members and restrained from axial expansion by said stop surfaces when said piston is in its said neutral position, each of said stop members being arranged to act on a respective end of said spring to compress said spring when said piston moves toward a respective one of said two positions on each side of said seat to resist movement of said piston rod and thus of said piston out of its neutral position; and
   pressure differential means acting on the piston for exerting pressure on one side of the spring element depending upon the differential pressure.

2. A device as defined in claim 1 wherein said spring element is a pretensioned spring assembly.

3. A device as defined in claim 1 wherein said pressure differential means include means for placing the port which feeds hydraulic fluid to the left side of said piston into communication with the right side of said piston rod, and for placing the port which feeds hydraulic fluid to the right side of said piston into communication with the left side of said piston rod for decreasing the difference of the hydraulic forces effective upon both sides on the valve piston.

4. A device as defined in claim 1 wherein said pressure differential means include channel means, which pass through the piston for transferring pressure which is exerted on one side of the piston to the other side of the piston into a chamber which provides the counter pressure for forming the pressure differential.

5. A device as defined in claim 1 wherein the spring element is pretensioned and positioned coaxially with the piston rod.

6. A device as defined in claim 1, further comprising a spring rod which passes axially through said spring element into said piston rod and which extends exteriorly of said device, said spring rod being threadedly connected to said piston rod and being rotatable with respect to said spring cylinder, a collar on said spring rod constituting one of said members, a stop member seat mounted on said spring rod for rotation therewith and for axial displacement with respect thereto, said stop member seat being disposed at one end of said resilient means and being threadedly movable in said device, wherein the pitch of the thread of said spring rod is equal to that of the thread of said stop member seat.

7. In a piston valve device providing a safety cross-connection between a feed conduit and a return conduit in hydraulic machines disposed in a system having a closed hydraulic flow path, the improvement comprising, in combination:
(A) a valve body having
(1) a piston valve cylinder,
(2) a piston valve seat in said piston valve cylinder and disposed transversely thereof to divide the cylinder into two portions, and
(3) first and second ports offset from each other in the axial direction and each respectively in communication with a different cylinder portion;
(B) a valve piston having a neutral position in said valve seat which blocks communication between said cylinder portions and thus between said ports and movable axially to the side of said seat into each cylinder portion to permit communication between said cylinder portions;
(C) a valve piston rod having two portions each extending axially from a different side of said piston and each rod portion being supported for axial movement, one piston rod portion having a threaded bore therein;
(D) means defining a spring cylinder disposed axially with respect to said piston rod;
(E) a spring assembly disposed in said spring cylinder and arranged to be pretensioned and dually effective and including a spring rod passing axially through said spring assembly and at one end threadedly connected into the bore in said one piston rod portion and rotatable from the outside, a collar on said spring rod and engaging one end of said spring assembly; and
(F) a spring stop member threaded in said spring cylinder and abutting against one end of the spring assembly, said stop member being provided on said spring rod in an axially displaceable but non-rotatable manner and the pitch of the spring rod thread being equal to the pitch of the stop member.

8. A device as defined in claim 7 comprising a shaft rotatably mounted in said valve body and extending outwardly therefrom, said shaft being disposed on the opposite side of said piston rod from said spring assembly and coupled to said piston rod, said spring rod being fixed in said valve body so that rotation of said shaft from outside the valve body rotates the piston rod with respect to said spring rod to thus open the valve by moving said valve piston.

9. A piston valve device for use in balancing pressure between two pressure medium conduits, comprising in combination:
(A) an elongate valve body having
(1) a piston valve cylinder disposed longitudinally thereof;
(2) a piston valve seat in said piston valve cylinder and disposed transversely thereof to divide the cylinder into two portions,
(3) first and second ports offset from each other in the longitudinal direction and each respectively in communication with a different cylinder portion, and
(4) a spring cylinder chamber open to the atmosphere through one end of said body and in communication with said piston valve cylinder;
(B) a valve piston having a neutral position in said valve seat which blocks communication between said cylinder portions and thus between said ports and movable axially by a pressure medium to the side of said seat into a cylinder portion on the side of the piston opposite the greater pressure to permit communication between said cylinder portions;
(C) a valve piston rod having two portions each extending axially from a different side of said piston;
(D) a spring cylinder casing defining a spring cylinder disposed in said chamber, said casing having an end wall defining one end of said valve cylinder and having an opening therein which slidably supports one piston rod portion, said one piston rod portion having a threaded bore in the end thereof, said casing at the opposite end from said wall being open and threaded;
(E) a cup-shaped spring stop member opening into said spring cylinder, threaded into the open end of said casing, and having an opening therethrough in alignment with the bore in said one piston rod portion;
(F) a spring assembly including a stack of disk spring elements disposed in said spring cylinder, and a spring rod passing axially through said spring cylinder and said disk spring elements and at one end threadedly connected into the bore in said one piston rod portion which engages one end of the stack of spring elements and the other end of said spring rod extending through the opening in said spring stop member and being splined thereto for rotation therewith, said stop member having threads of the same pitch as said threaded bore in said one piston rod portion, a collar fixed on said spring rod and normally disposed near the open end of said cup-shaped spring stop member and said collar and stop member engaging the other end of the stack of spring elements, whereby rotation of said spring rod with respect to said piston rod changes their relative axial positions and changes the force exerted on said stack by said one piston rod portion and said collar and stop member;
(G) a hollow bolt closing the end of said body and arranged to be locked in place to prevent rotation thereof, said bolt being splined to said other end of the spring rod;
(H) a rotatable handle shaft extending into said body from the outside at a location in axial alignment with said piston rod and on the opposite side thereof from said spring assembly, the inner end of said handle shaft being hollow and axially displaceably accommodating the other piston rod portion and rotatable therewith, so that rotation of said handle shaft causes relative rotation and thus relative axial displacement of said piston rod and said spring rod and changes the axial position of said valve piston and changes the tension of said spring assembly.

10. In a piston valve device providing a safety cross-connection between a feed conduit and a return conduit in hydraulic machines disposed in a system having a closed hydraulic flow path, the improvement comprising:
   spaced first and second conduit connections;
   means defining a valve piston cylinder which is in communication with said conduit connections;
   a valve seat disposed in said valve piston cylinder and via which said conduit connections may be in communication with each other;
   a valve piston having a neutral position in said seat and blocking communication between said conduit connections and movable toward two positions one on each side of said seat to permit communication between said conduit connections;
   a valve piston rod extending from both sides of said piston and supported on both sides thereof;
   resilient means connected to said piston rod to resist movement of said piston rod and thus of said piston out of its neutral position; and
   means for placing the port which feeds hydraulic fluid to the left side of said piston into communication with the right side of said piston rod, and for placing the port which feeds hydraulic fluid to the right side of said piston into communication with the left side of said piston rod for decreasing the difference of the hydraulic forces effective upon both sides on the valve piston, said means including bores in said valve piston and piston rod and chambers adjacent the end faces of said piston rod and elements connected for axial movement therewith.

References Cited by the Examiner
UNITED STATES PATENTS

| | | | |
|---|---|---|---|
| 1,798,536 | 3/1931 | Hofmann | 137—493 |
| 2,679,235 | 5/1954 | Van Meter | 137—625.68 |
| 2,791,966 | 5/1957 | Moulton | 137—493 X |
| 2,803,312 | 8/1957 | Lucien | 137—493 X |

M. CARY NELSON, *Primary Examiner.*

MARTIN P. SCHWADRON, *Examiner.*